US009959358B2

(12) United States Patent
Lam

(10) Patent No.: US 9,959,358 B2
(45) Date of Patent: May 1, 2018

(54) NAVIGATION TOOL FOR DEVICE USER INTERFACE

(71) Applicant: Oracle International Corporation, Redwood Shores, CA (US)

(72) Inventor: Benson Lam, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 323 days.

(21) Appl. No.: 14/457,878

(22) Filed: Aug. 12, 2014

(65) Prior Publication Data
US 2015/0082251 A1  Mar. 19, 2015

Related U.S. Application Data

(60) Provisional application No. 61/878,990, filed on Sep. 17, 2013.

(51) Int. Cl.
*G06F 17/30* (2006.01)
*G06F 3/0482* (2013.01)

(52) U.S. Cl.
CPC ...... *G06F 17/30876* (2013.01); *G06F 3/0482* (2013.01); *G06F 17/30126* (2013.01)

(58) Field of Classification Search
CPC .... G06F 3/048; G06F 3/0481; G06F 3/04812; G06F 3/0482; G06F 3/0483; G06F 3/0488; G06F 3/04895
See application file for complete search history.

(56) References Cited

U.S. PATENT DOCUMENTS

| | | | | |
|---|---|---|---|---|
| 7,818,683 | B2 * | 10/2010 | Sorin | G06F 17/30873 715/768 |
| 2004/0066411 | A1 * | 4/2004 | Fung | G06F 3/0481 715/781 |
| 2004/0128275 | A1 * | 7/2004 | Moehrle | G06F 17/30126 |
| 2012/0254801 | A1 * | 10/2012 | Gaffney | G06F 3/0482 715/825 |

(Continued)

OTHER PUBLICATIONS

YouTube video by user SmartPlugins, "Smart Responsive Breadcrumbs," published Feb. 20, 2013, downloaded from https://www.youtube.com/watch?v=tCpedGpDy6M.*

(Continued)

*Primary Examiner* — Jennifer To
*Assistant Examiner* — Eric Yoon
(74) *Attorney, Agent, or Firm* — Trellis IP Law Group, PC

(57) ABSTRACT

An example method for facilitating software navigation includes storing navigation history information pertaining to user interaction with software; displaying one or more representations of breadcrumbs in accordance with the navigation history information, resulting in displayed breadcrumbs; detecting when a number of breadcrumbs exceeds a threshold number of breadcrumbs; and replacing, in response to the detection, one or more of the breadcrumbs with a user interface control adapted to selectively display representations of the one or more breadcrumbs in response to user selection of the user interface control. Hence, certain breadcrumbs of a breadcrumb trail may be condensed or collapsed, e.g., into a drop-down menu control, when a breadcrumb trail would otherwise be too large to display.

20 Claims, 10 Drawing Sheets

(56) References Cited

U.S. PATENT DOCUMENTS

2013/0002796 A1\* 1/2013 Hiller .................... G06F 3/0482
  348/14.01

OTHER PUBLICATIONS

Spring S. Hull; "Influence of Training and Experience on the Usage of Breadcrumb Navigation"; 4 pages; downloaded via circa May 22, 2014.
Bonnie Lida Rogers and Barbara Chaparro; "Breadcrumb Navigation: Further Investigation of Usage"; 7 pages, downloaded via circa May 22, 2014.

\* cited by examiner

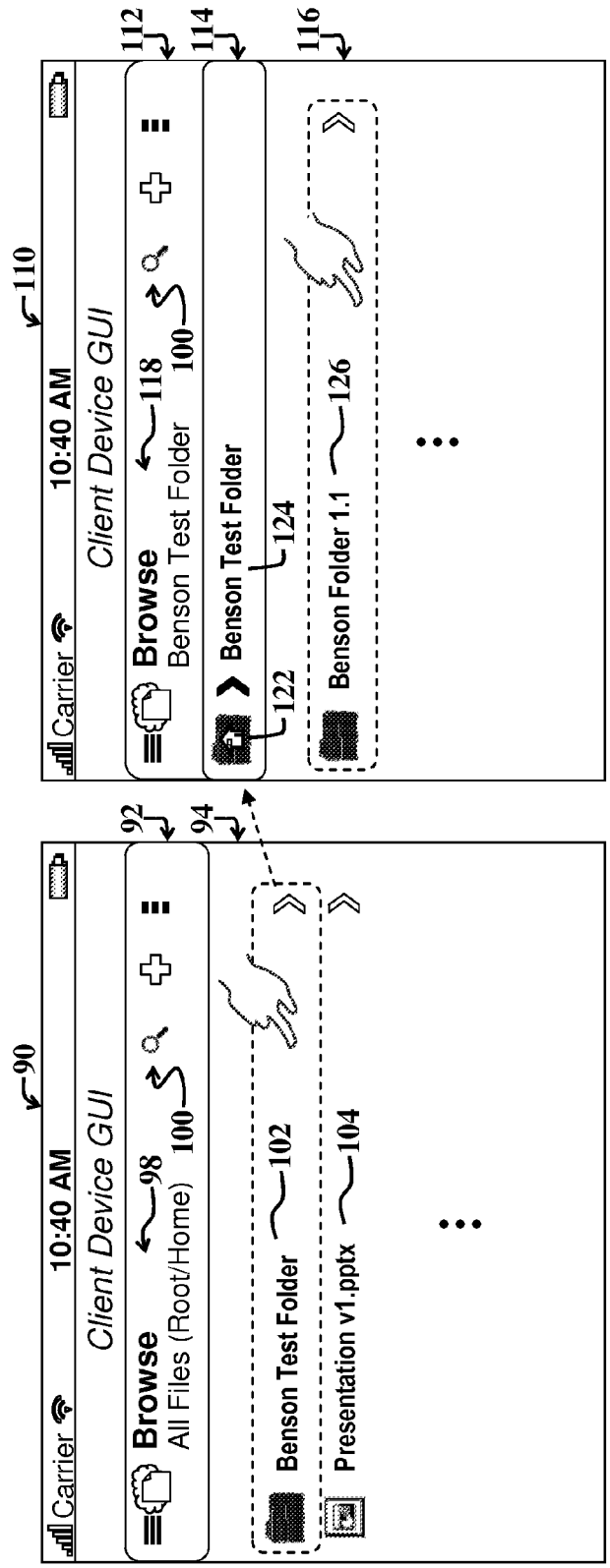

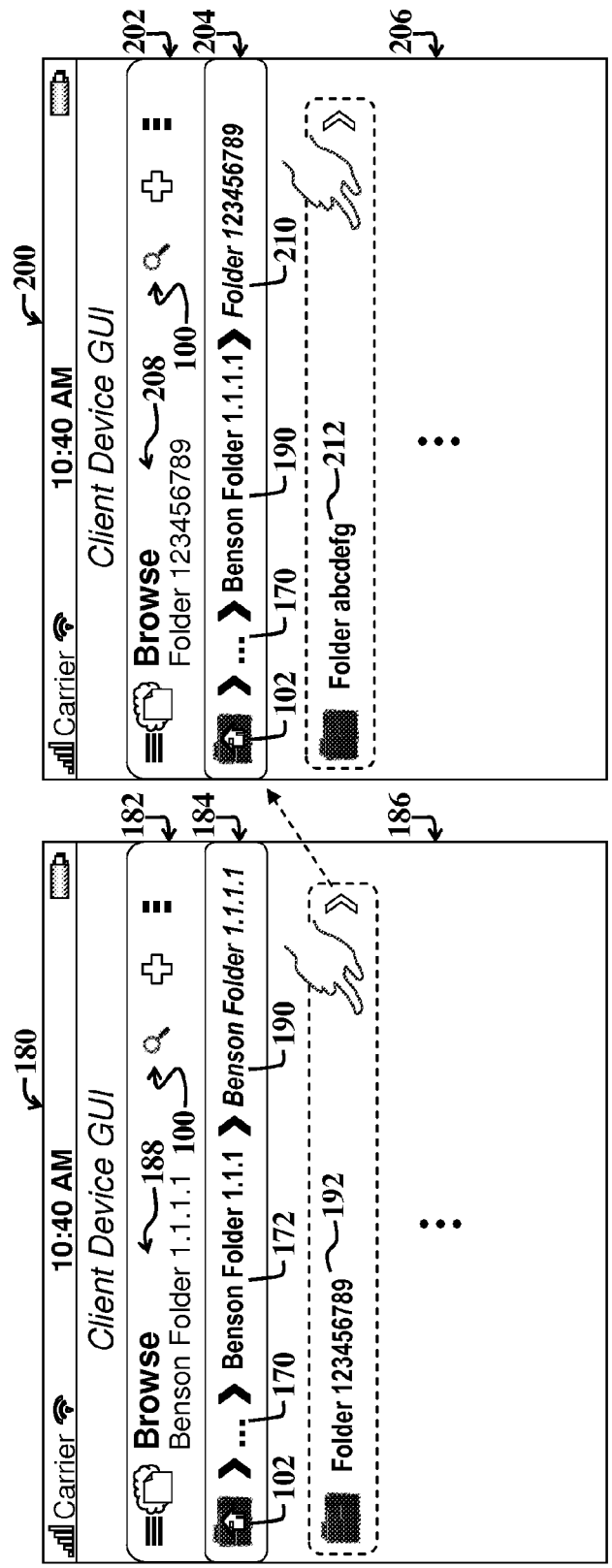

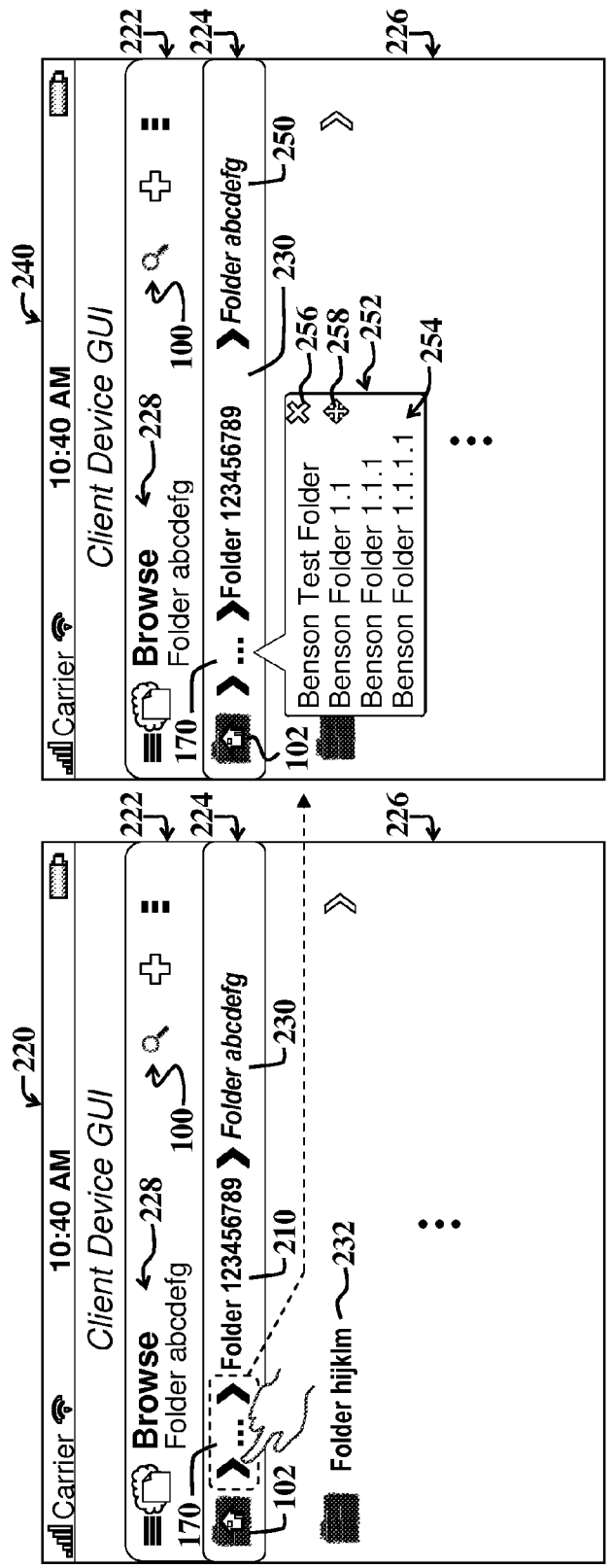

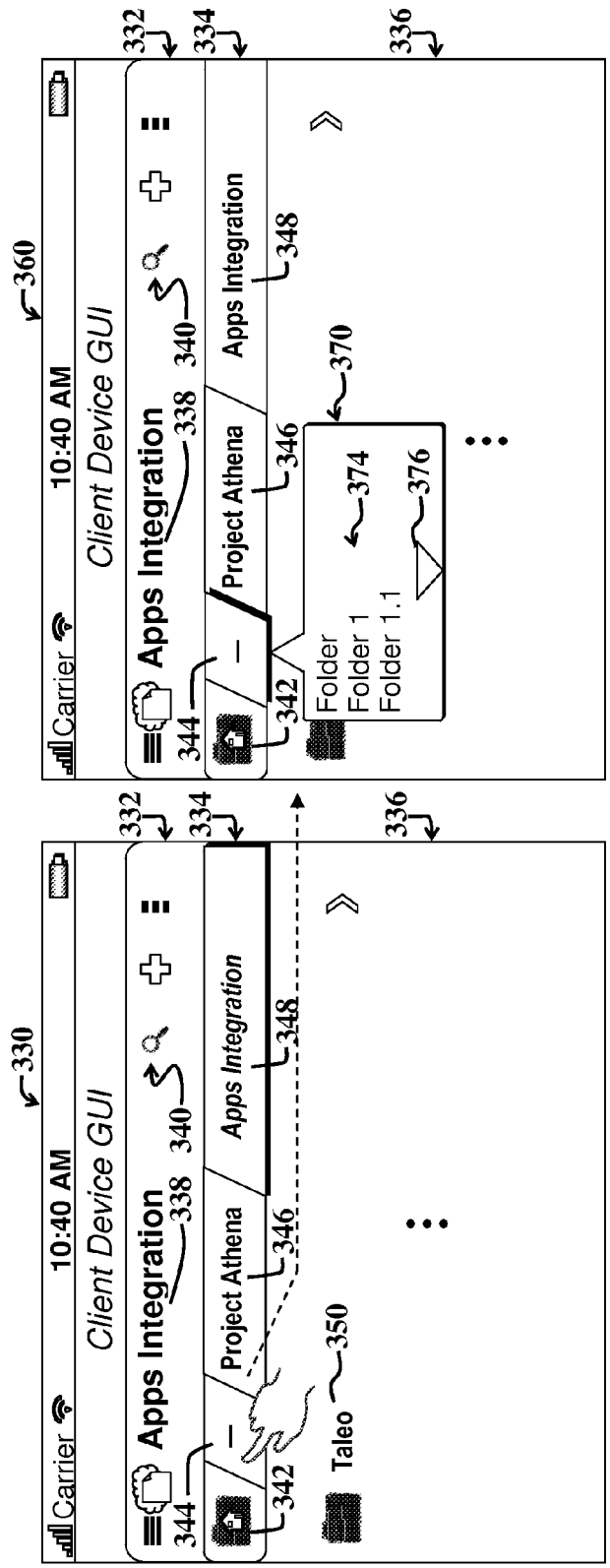

NAVIGATION TOOL FOR DEVICE USER INTERFACE

CROSS REFERENCES TO RELATED APPLICATIONS

This application claims priority from U.S. Provisional Patent Application Ser. No. 61/878,990, entitled NAVIGATION TOOL FOR DEVICE USER INTERFACE, filed on Sep. 17, 2013, which is hereby incorporated by reference as if set forth in full in this application for all purposes.

This application is related to the following applications: U.S. patent application Ser. No. 29/482,466, entitled GRAPHICAL USER INTERFACE FOR A DISPLAY OR PORTION THEREOF, filed on Feb. 19, 2004; U.S. patent application Ser. No. 29/482,467, also entitled GRAPHICAL USER INTERFACE FOR A DISPLAY OR PORTION THEREOF and filed on Feb. 19, 2004; and U.S. patent application Ser. No. 13/077,673, entitled REAL-TIME MENU ARCHITECTURE, filed on Mar. 31, 2011, which are incorporated by reference as if set forth in full in this application for all purposes.

BACKGROUND

The present application relates to software and more specifically to user interfaces and accompanying features for facilitating navigating or accessing electronic content or software functionality.

Software navigation mechanisms are employed in various demanding applications, including web browsers for navigating websites; file system explorers for browsing folders and files; database software for navigating hierarchical structures of a database, and so on. Such applications often demand user friendly mechanisms for enabling efficient user access to files and folders, webpages, software functionality, and other electronic content.

Efficient software navigation mechanisms are particularly important in mobile applications, such as mobile web browsers and enterprise applications, where relatively small display screens may hinder efficient navigation of complex content.

SUMMARY

An example method for facilitating software navigation includes accessing user navigation history information; displaying one or more representations of software breadcrumbs in accordance with the navigation history, resulting in displayed breadcrumbs; detecting when a number of software breadcrumbs exceeds a threshold number of software breadcrumbs; and replacing, in response to the detection, one or more of the software breadcrumbs with a User Interface (UI) control adapted to selectively display representations of the one or more software breadcrumbs in response to user selection of the user interface control.

In a more specific embodiment, the user interface control includes a drop-down menu that is activated in response to user selection of the user interface control (i.e., the breadcrumb button or overflow icon). The drop-down list indicates one or more previously displayed user interface display screens. The one or more previously displayed user interface display screens may represent different webpages; file system folders; objects in a database; and/or other UI display screens, including navigatable locations in an electronic document or software UI structure.

The displaying step may further include positioning the one or more displayed software breadcrumbs in a breadcrumb bar. The drop-down menu indicates or identifies one or more intervening user interface display screens between a first displayed breadcrumb and a second displayed breadcrumb in the breadcrumb bar. The first and second displayed breadcrumbs may be positioned on opposite sides of the user interface control, i.e., breadcrumb button.

Intervening user interface display screens named in the drop-down menu may include one or more user selectable representations of one or more folders between the first displayed breadcrumb and the second displayed breadcrumb in accordance with a document folder hierarchy and/or visit order. In certain implementations, the one or more representations of the one or more folders include a representation of a folder that was not previously visited in a navigation secession for which the navigation history is maintained.

In the specific embodiment, the breadcrumb button (for displaying the drop-down menu) is positioned between a home button (also called start location button or root breadcrumb) and a parent breadcrumb of a current location breadcrumb. The parent breadcrumb button represents a UI display screen or associated folder, document, or other navigatable software location from which a current location was navigated to before the currently displayed UI display screen. The currently displayed UI display screen is represented via the current location breadcrumb.

The specific example method further includes detecting when one or more names of one or more breadcrumbs will not fit within a displayed breadcrumb bar, and then selectively abbreviating the one or more names in response to the detection.

Hence, certain embodiments herein implement certain breadcrumb features for facilitating software navigation, including navigation of UI display screens, which may display folder data, web page data, menu items in a menu hierarchy, data objects in a database, and so on. In particular, certain methods discussed herein involve selectively condensing or collapsing breadcrumbs of a breadcrumb trail into drop-down menus (accessible via breadcrumb button) when a visited breadcrumb trail would otherwise be too large to display or represent in a UI display screen bar.

A further understanding of the nature and the advantages of particular embodiments disclosed herein may be realized by reference of the remaining portions of the specification and the attached drawings.

BRIEF DESCRIPTION OF THE DRAWINGS

FIG. 3A illustrates a third example UI display screen adapted for use with a mobile computing device, such as a smartphone, and displaying a root folder in advance of further software navigation.

FIG. 3B illustrates a forth example UI display screen, which represents an updated version of the third example UI display screen of FIG. 3A after navigation to a first subfolder of the root folder, and illustrating addition of a first breadcrumb to a breadcrumb bar.

FIG. 3E illustrates a seventh example UI display screen, which represents an updated version of the sixth UI display screen of FIG. 3D after navigation to a fourth subfolder of the third subfolder, and illustrating addition of a fourth breadcrumb to the breadcrumb bar and a collapsing of the second breadcrumb into the overflow control.

FIG. 3F illustrates an eighth example UI display screen, which represents an updated version of the seventh UI display screen of FIG. 3E after navigation to a fifth subfolder of the fourth subfolder, and illustrating addition of a fifth breadcrumb to the breadcrumb bar and a collapsing of the third breadcrumb into the overflow control.

FIG. 3G illustrates a ninth example UI display screen, which represents an updated version of the eighth UI display screen of FIG. 3F after navigation to a sixth subfolder of the fifth subfolder, and illustrating addition of a sixth breadcrumb to the breadcrumb bar and a collapsing of the fourth breadcrumb into the overflow control.

FIG. 3H illustrates a tenth example UI display screen, which represents an updated version of the ninth example UI display screen of FIG. 3G after activation of the overflow control to display a drop-down menu with breadcrumbs therein.

FIG. 5A illustrates a thirteenth example UI display screen showing a modified version of the breadcrumb bar and header bar of the eleventh example UI display screen of FIG. 4A.

FIG. 5B illustrates a fourteenth example UI display screen, which represents an updated version of the thirteenth example UI display screen of FIG. 5A after user selection of the breadcrumb button and subsequent display of a drop-down menu and associated breadcrumbs.

DETAILED DESCRIPTION OF EMBODIMENTS

Software Graphical User Interfaces (GUIs) often employ mechanisms, such as breadcrumbs, for displaying user navigation history and/or other navigation context. A breadcrumb trail may include displayed breadcrumbs implemented as hyperlinks to previously visited webpages, folders, files or other user interface display screens.

However, such breadcrumb trails can quickly become prohibitively large and unsuitable for small mobile device displays. Accordingly, existing mobile applications often omit or otherwise limit displayed breadcrumbs to a home button and/or back button.

For the purposes of the present discussion, software navigation (also simply called navigation) may refer to a transition of a graphical user interface display from display of a first user interface display screen to a second user interface display screen.

A user interface display screen may be any software-generated depiction presented on a display. Examples of depictions include windows, dialog boxes, displayed tables, and any other graphical user interface features, such as user interface controls presented to a user via software, such as a browser. A user interface display screen contained within a single border may be called a view or window. Views or windows may include sections, such as sub-views or sub-windows, dialog boxes, graphs, tables, and so on. In certain cases, a user interface display screen may refer to all application windows presently displayed on a display.

For clarity, certain well-known components, such as hard drives, processors, operating systems, power supplies, and so on, have been omitted from the figures. However, those skilled in the art with access to the present teachings will know which components to implement and how to implement them to meet the needs of a given application.

Figure 1:
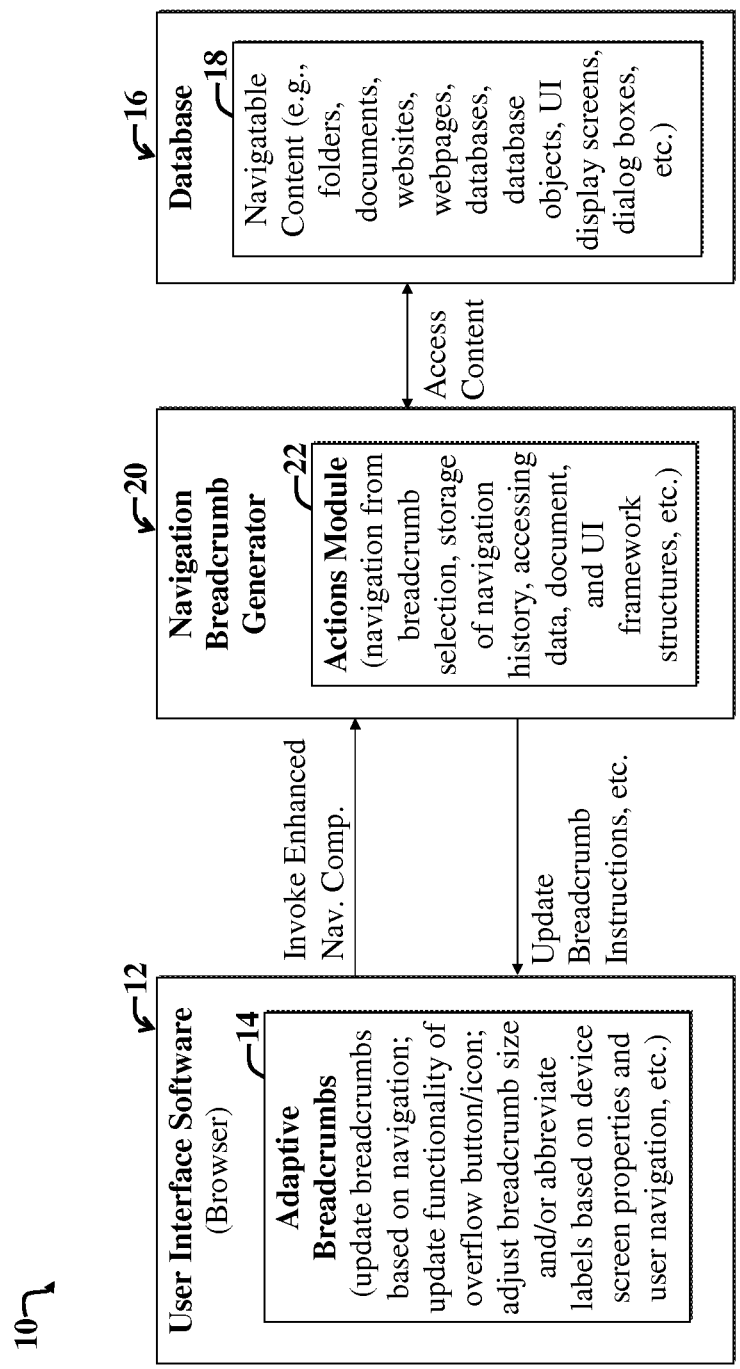
FIG. 1 is diagram illustrating a first example embodiment of a system for facilitating implementing User Interface (UI) display screens with compact adaptive breadcrumb navigation tools that enable selective combining of breadcrumbs into a user interface control.

FIG. 1 is diagram illustrating a first example embodiment of a system 10 for facilitating implementing User Interface (UI) display screens with compact adaptive breadcrumb navigation tools 12, 20 that enable selective combining of breadcrumbs 14 into a user interface control, such as an overflow UI control, also called an overflow UI control, an overflow button (or icon), a start location button, a current location button, or a root button.

For the purposes of the present discussion, a UI control may be any displayed element or component of a UI display screen, which is adapted to enable a user to provide input, view data, navigate, and/or otherwise interact with a UI. Additional examples of UI controls include buttons, drop down menus, menu items, tap-and-hold functionality, and so on. Similarly, a UI control signal may be any signal that is provided as input for software, wherein the input affects a UI display screen and/or accompanying software application associated with the software.

The example system 10 includes UI software 12, such as a browser and accompanying Graphical User Interface (GUI) software, which may run on a computer, such as a mobile device (e.g., tablet, smartphone, laptop, etc.). The UI software 12 communicates with a navigation breadcrumb generator 20, which communicates with a database 16.

For the purposes of the present discussion, a database may be any mechanism, such as software and/or hardware for storing content, such as navigatable content 18. The navigatable content 18 of the database 16 may include, for example, folders of a file system, documents, websites and constituent webpages, Enterprise Resource Planning (ERP) databases, and so on.

A file system folder may be any software mechanism for containing one or more computer files, e.g., documents. Hence, a file system folder may include a webpage of a website, a folder on a computer hard drive, and so on.

For the purposes of the present discussion, navigatable content, such as the content 18, may be any electronic content that may be navigated via software navigation.

Software navigation may be any manipulation of a software UI to view different UI display screens, which may display different data objects, documents, files, and so on. Hence, software navigation (also simply called navigation herein) may refer to a transition of a graphical UI display from a first display of one or more objects to a second display of one or more objects in response to user selection of an object or control in the first display of one or more objects.

Accordingly, when a user interacts with software to transition from a first display of one or more objects to a second display of one or more objects in response to user selection of an object or control in the first display of one or more objects, the user is said to navigate from first UI display screen to a second UI display screen or from the first set of one or more objects (e.g., a first folder, webpage, etc.) to the second set of one or more objects (e.g., a second folder, webpage, etc.).

A user is said to navigate data or to navigate a menu if the user selects one or more different displayed objects (i.e., representations of objects), items, or UI controls to activate display of other objects, UI controls, or items to be displayed. An object, such as a data object, may be any grouping of data and/or functionality. A representation of an object, i.e., a displayed object, may be displayed via graphical depiction, such as a menu item, dialog box, and so on. The graphical depiction of an object may also be called an object, a displayed object, or a node.

The example navigation breadcrumb generator 20 includes an actions module 22, which includes computer code and memory for storing navigation history information, triggering transition of UI display screens based on detection of user selection of breadcrumbs, accessing data and content 18 from the database 16 to facilitate displaying documents (e.g., webpages), accessing UI frame work structures, e.g., Document Object Model (DOM) structures, database organizational structures or hierarchies, GUI layout structures, and so on.

For the purposes of the present discussion, navigation history information may be any data pertaining to or characterizing a record of software usage, data access, browsing, and/or other types of software navigation. Hence, navigation history information may include any information pertaining to a sequence of user interactions with software, including information about when a particular UI display screen was visited. The terms "navigation history information" and "navigation history" may be employed interchangeably herein.

For the purposes of the present discussion, a breadcrumb may be any mechanism for indicating a previously visited menu item, UI display screen, or other navigation location, e.g., database object, folder, file, dialog box, and so on. In the present specific embodiment, a particular displayed representation of a breadcrumb (also called a breadcrumb) may act as a hyperlink upon user selection thereof, where the hyperlink triggers display of a UI display screen representative of the name of the breadcrumb.

Hence, the term "breadcrumb" may include data characterizing a user UI display screen associated with or indicated via the breadcrumb and/or the displayed representation of the UI control characterizing the breadcrumb, and/or functionality associated with the UI control.

For example, a particular type of breadcrumb (e.g., overflow control) may be implemented, in part, as an object that includes navigation history information pertaining to a displayed webpage, folder, file, UI display screen, or other navigation location, and that further includes sufficient functionality to facilitate enabling user access to the navigation history information. Depending upon context, the term "breadcrumb" or "breadcrumb indicator" may also refer to a displayed representation of a breadcrumb (e.g., displayed breadcrumb name); not just the underlying object and associated software functionality.

In the present example embodiment, the software GUI implemented via the UI software 12 may employ various mechanisms, including breadcrumbs, to display user navigation history and/or navigation context indicating a relative position in a website page hierarchy or file system hierarchy. A breadcrumb trail, which may illustrate a navigation path (or portion thereof), may be displayed in a breadcrumb bar (which may be a type of navigation bar), which includes links to previously visited webpages, folders, files and/or other UI display screens, as discussed more fully below.

In general, a breadcrumb trail represented in a breadcrumb bar may indicate a current navigation location and provide mechanisms enabling users to transition to display of previously visited navigation locations, i.e., UI display screens. A breadcrumb bar may be any UI feature that visually encloses one or more breadcrumbs and/or representations of one or more breadcrumbs via a border or other visually distinguishing or demarcating mechanism. Certain breadcrumb bars may indicate so-called breadcrumb trails and/or provide other navigation history information.

The UI software 12 may be implemented via a browser, which may include or otherwise access adaptive breadcrumb software 14 functionality. For the purposes of the present discussion, software functionality may be any function, capability, or feature, e.g., stored or arranged data, that is provided via computer code, i.e., software. Generally, software functionality may be accessible via use of a UI, and accompanying UI controls and features. Software functionality may include actions, such as retrieving data pertaining to a business object; performing an enterprise-related task, such as promoting, hiring, and firing enterprise personnel, placing orders, calculating analytics, launching certain dialog boxes, performing searches, and so on.

The example adaptive breadcrumb software 14 includes computer code for calling or otherwise invoking functionality of the actions module 22 of the navigation breadcrumb generator 20. Note that navigation breadcrumb generator 20 may be implemented client-side (e.g., on the same computer as the UI software 12) or server-side (e.g., on the same computer as the database 16) without departing from the scope of the present teachings.

The adaptive breadcrumb software 14 includes computer code for selectively calling the actions module 22 to update breadcrumbs based on user navigation and navigation history information; to update functionality of an overflow control (e.g., button or icon); to adjust breadcrumb size or abbreviate breadcrumb labels based on device screen properties (e.g., size and resolution) and length of tracked navigation history, and so on. The actions module 22 may forward computer instructions and data as needed to the adaptive breadcrumbs module 14 to facilitate enabling functionality implemented via the adaptive breadcrumbs module 14.

In an example scenario, a user employs the UI software 12 to browse content, such as webpages of a website, maintained via the database 16 or other server. As the user employs GUI functionality of the UI software 12 to browse the content, the actions module 22 stores navigation history information, e.g., pertaining to which webpages the user visited and in what order. The adaptive breadcrumbs module 14 then requests and obtains navigation history information from the actions module 22, which is then used to build a breadcrumb trail (representative of the navigation history information) to be displayed in a breadcrumb bar of a UI display screen rendered via the UI software 12, as discussed more fully below.

When the number of navigation locations (represented via breadcrumbs) of the navigation history exceeds a threshold number (which is three in various example embodiments discussed herein), then computer code of the adaptive breadcrumb software 14 collapses one or more breadcrumbs of the breadcrumb bar into an overflow control, so that a limited number of breadcrumbs remain visible in a breadcrumb bar, and remaining breadcrumbs are collapsed into a the breadcrumb control.

A breadcrumb is said to be collapsed into a breadcrumb control if the representation of the breadcrumb is moved from an immediately displayed position in a breadcrumb bar, but which may be displayed upon activation of an overflow control. Activation of an overflow control may show, for example, a drop-down menu or list, which includes breadcrumbs that would otherwise be displayed in the breadcrumb bar.

The system 10 may be implemented via one or more computers, such as client devices and server systems, which may intercommunicate via the Internet. For example, the Navigation breadcrumb generator 20 may reside on a client device, such as tablet or smartphone, which communicates via the Internet with the server-side database 16. In general, various modules 12-22 of the system 10 may be grouped differently than shown, and certain modules may be combined with others, without departing from the scope of the present teachings.

Figure 2A:
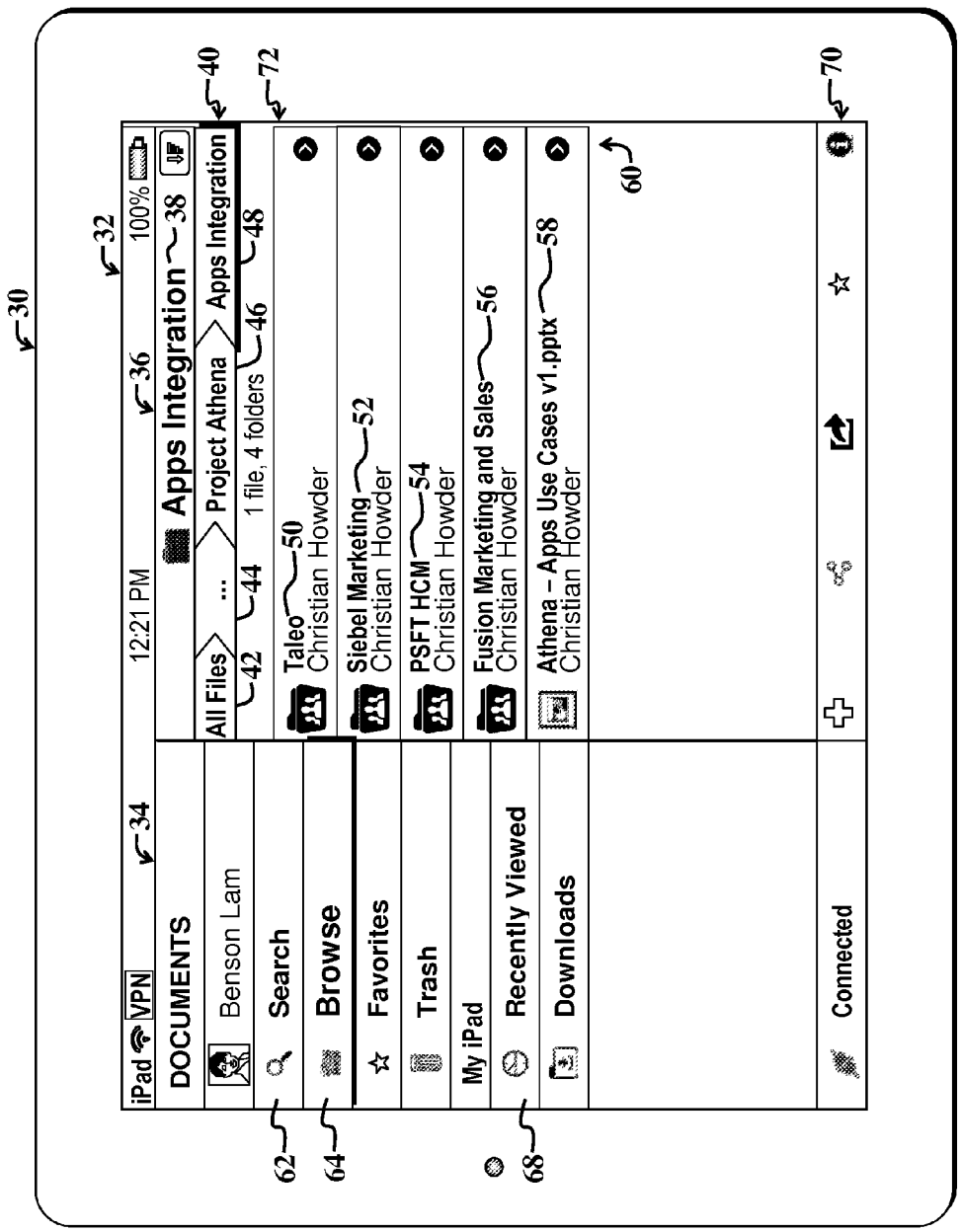
FIG. 2A illustrates a first example UI display screen illustrating a first example breadcrumb bar implemented according to the embodiment of FIG. 1 and adapted for use with a mobile computing device, such as a tablet.

FIG. 2A illustrates a first example computing device 30, e.g., a mobile device, such as a tablet running the UI software 12 in communication with the navigation breadcrumb generator 20 of FIG. 1. In the present example embodiment, a touch-screen display of the tablet 30 illustrates a first example UI display screen 32, which illustrates a first example breadcrumb bar 40.

The first example UI display screen 32 includes a left panel 34, which includes various UI controls 62-68 for facilitating performing various software-related tasks, such as searching, browsing, accessing recently viewed UI screens and related objects, and so on. A right panel 36 represents a content and navigation panel, which includes the breadcrumb bar 40 for facilitating representing navigation history information (e.g., previously visited UI display screens and associated objects corresponding to breadcrumbs) and providing mechanisms 42-48 that facilitate accessing previously visited navigation locations, i.e., UI display screens, indicated by names of the breadcrumbs 42, 46, 48.

The right panel 36 further includes a content section 72, which lists content and/or representations of content, such as folders 50-56 and file(s) 58 associated with a current navigation location, as indicated by a right-most breadcrumb 48 of the navigation bar 40, and a header 38 of the right panel 36. An example bottom toolbar 70 provides various UI controls for facilitating adding content, moving content, accessing content marked as favorite or adding content to a favorite category, accessing additional contextual information, such as help files, and so on. The content section 72 further includes various controls 60, which are adapted to enable user selection of elements (e.g., individual files and folders) of the indicated content 50-58 and subsequent navigation thereto.

In the present example embodiment, a user has triggered activation of browsing functionality via a browse control 64 in the left panel 34, which triggers display of the right panel 36. The right panel 36 is adapted for browsing content, such as file(s) 58 and folders 50-56.

A user has employed the underlying UI software to browse to an Apps Integration folder, contents of which are exemplified by the folders 50-56 and file 58 of the content section 72 of the right panel 36. The current navigation location corresponding to the Apps Integration folder represented by the content section 72 is indicated, by name, in the header 38 of the right panel 36 and Apps Integration breadcrumb 48 of the breadcrumb bar 40.

During the course of browsing, the user had first started browsing content from an all files folder, represented by a home breadcrumb 42. The home breadcrumb 42 is also called the root breadcrumb or button, or the start location breadcrumb or button, the start location button, or the navigation starting position.

The user subsequently browsed to various folders before browsing to a project Athena folder, as indicated by a second-to-rightmost breadcrumb 46. The second-to-rightmost breadcrumb 46 is also called the second breadcrumb or the parent location button (parent of the rightmost breadcrumb 48) herein.

The user subsequently browsed from a UI display screen indicated via the second breadcrumb, i.e., the Project Athena breadcrumb 46, to the UI display screen 72 associated with, i.e., indicated by the Apps Integration breadcrumb 48. The Apps Integration breadcrumb 48 is the rightmost breadcrumb in the breadcrumb bar 40, and is also called the third breadcrumb, the current breadcrumb, or the current location breadcrumb, herein.

The various breadcrumbs 42, 46, 48 and overflow control 44 are considered navigation buttons or navigation controls herein. For the purposes of the present discussion, a navigation control may be any UI control, such as a button, icon, hyperlink, or other UI control that is adapted to facilitate software navigation, such as by providing indications of navigation locations and user options to navigate to the indicated navigation locations. The navigation locations may represent UI display screens and content associated with names of breadcrumbs corresponding to UI controls 42, 46, 48.

In the present example embodiment, various breadcrumbs associated navigation locations browsed to before the Project Athena location (indicated by the second breadcrumb 46) have been collapsed into a breadcrumb UI control 44 positioned between the start location breadcrumb 42 and the second breadcrumb, i.e., Project Athena breadcrumb 46. To view such intermediate breadcrumbs, a user may tap or otherwise select the breadcrumb UI control 44 to trigger display of a drop-down menu indicating the intervening breadcrumbs, as discussed more fully below. The breadcrumb UI control 44 is also simply called the breadcrumb control, the middle breadcrumb, the breadcrumb button, the drop-down UI control, the expandable icon, the overflow folder, the overflow control, or the overflow button.

Hence, the breadcrumb bar 40 may include various UI controls, e.g., buttons, hyperlinks, icons, tabs, or other UI controls, which are adapted to facilitate both indicating navigation history information (via breadcrumbs and/or overflow controls) and to facilitate user access to content indicated by the navigation history information.

Hence, in the present example embodiment, the leftmost breadcrumb 42, i.e., the home or root breadcrumb is positioned adjacent to and to the left of the overflow control 44, and the second-to-last breadcrumb 46 (also called the second breadcrumb 46) is positioned adjacent to and to the right of the overflow control 44. The rightmost breadcrumb 48, indicating, e.g., naming, currently displayed content 50-58 and functionality 60, is positioned approximately adjacent to and to the right of the second-to-last breadcrumb 46. In general, the rightmost breadcrumb 48 indicates the currently displayed file, page, document, etc.

Note that in certain alternative implementations, the second-to-last breadcrumb 46 is not necessarily shown immediately in the breadcrumb bar 40, but may be shown in a drop-down menu triggered in response to user selection of the overflow control 44. In such implementations, the second-to-right breadcrumb 46 (representing the second most recently visited navigation location) is said to be collapsed into the overflow control 44.

Note that while the breadcrumb bar 40 is shown horizontally disposed below the header 38, that the position and orientation of the breadcrumb bar 40 may vary, without departing from the scope of the present teachings. For example, in certain implementations, the breadcrumb bar 40 may be made draggable and repositionable, e.g., via use of a dragging button or other mechanism. Additional possible modifications include use of an additional control in the rightmost breadcrumb 48, the selection of which may trigger display of properties, settings, and/or other information and/or functionality associated with the underlying breadcrumb and/or currently displayed content.

Note that while the present embodiment illustrates browsing of files and/or folders of a file system or website, embodiments are not limited thereto. For example, virtually any UI display screens and associated functionality and/or content may be represented as navigation locations and associated with breadcrumbs, without departing from the scope of the present teachings.

In summary, FIG. 2A shows the UI display screen 32 including the content section 72 (shown including a list of folders 50-56 and a file 58) and the overflow control 44 (i.e., breadcrumb button).

In FIG. 2A, a user can select a folder in the folder list by, e.g., clicking with a mouse or trackpad; tapping with a finger, swiping, voice command, etc., according to the preferred user input method for the device. Once selected, the user is taken to the folder location whereupon the items within the selected folder are displayed in the folder list area, i.e., content section 72, in place of the currently displayed folder list in a manner that is well-known in the art.

In FIG. 2A, the device may be an iPad® with an iOS® operating system by Apple Computer, Inc.®. Note that although specific devices, operating systems, applications or other details may be described, features of the embodiments discussed herein are generally suitable for use with any device, platform, environment, application or other combination of hardware and software, as desired.

In FIG. 2A, the "All Files" button 42 is used to show the root directory. In other embodiments this button may be used to designate a starting location, a master directory for an application, a user's springboard or starting page, or any other desired predetermined or default directory. The "All Files" button 42 can be referred to as the "start location" button and is placed at the leftmost side of navigation bar 40 that includes "All Files" starting location button 42, breadcrumb button 44, parent location button 46 and current location button 48. These buttons form a left-to-right history of locations that the user has visited. In other embodiments, different arrangements may be used and more or less buttons may be shown.

In a particular embodiment, the folders that the user has visited are not deterministic of the navigation buttons or of the breadcrumb list. Rather, the folders between the root folder and the current folder are listed regardless of whether the user has visited the intervening folders or not. For example, in FIG. 2A, the user could have arrived at the "Apps Integration" folder by jumping from a different folder or by being placed there after launching or running an application, or by other means. In this case, the navigation bar is launched and software determines the number of folders intervening between the user's current location and the user's starting, default, root or other base location. The base location is listed as the leftmost navigation button labeled "All Files" button 42, followed by breadcrumb button 44, "Project Athena" button 46 and "Apps Integration" button 48 which is highlighted or shown as "pressed" because it is the current directory.

In another embodiment, breadcrumb button 44 does not appear in navigation bar 40 until after the user has progressed a predetermined number of navigation locations from the starting location. For example, breadcrumb button 44 will not appear until the user has progressed to a $3^{rd}$ directory from the starting directory. This is because up until the user visits a $3^{rd}$ level directory (or "sub directory") the starting, parent and current location buttons are sufficient to allow navigation to the 0, 1 or 2 locations that the user has visited (not counting the starting directory).

Figure 2B:
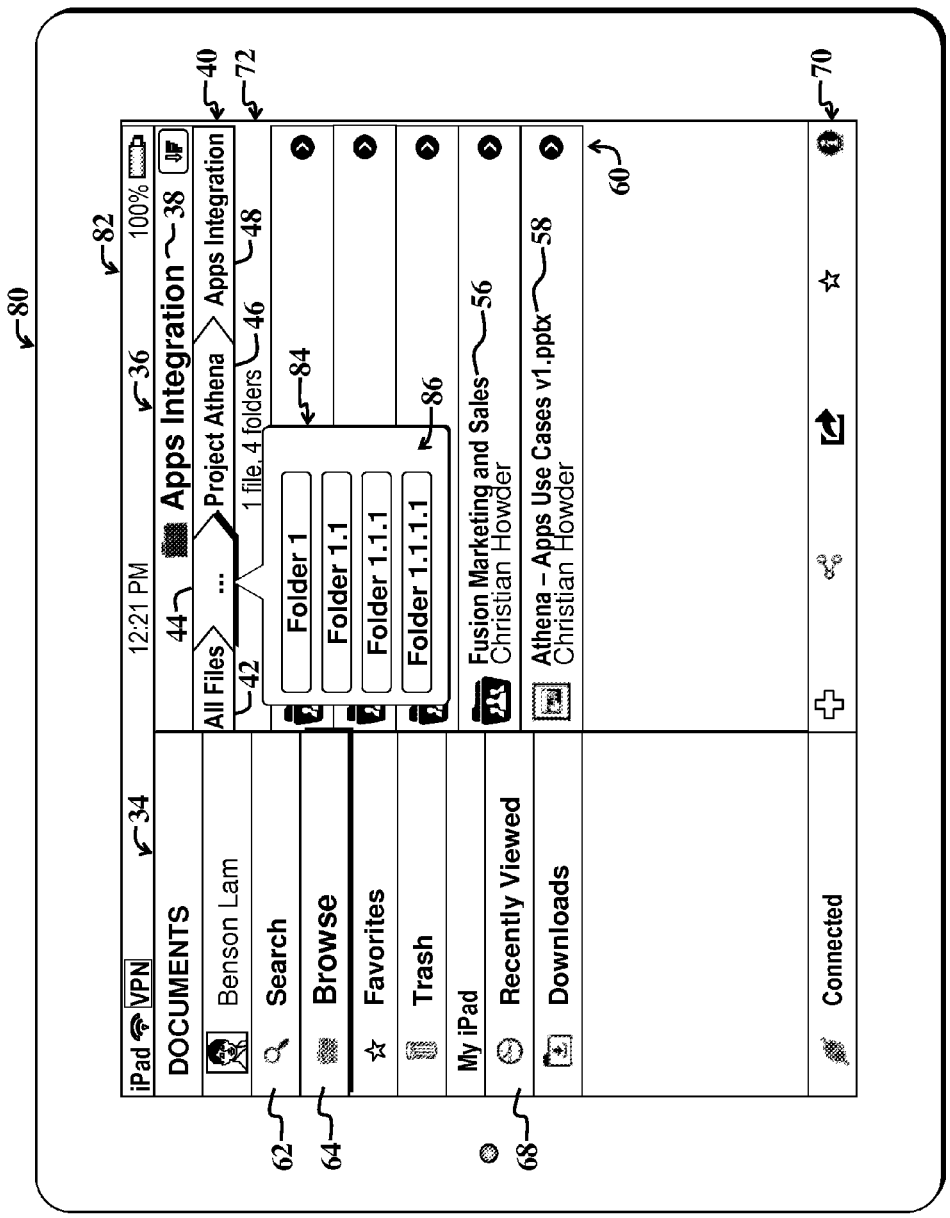
FIG. 2B illustrates a second example UI display screen representing the first example UI display screen of FIG. 2A after user selection of an overflow control of the breadcrumb bar.

FIG. 2B illustrates a second example UI display screen 80, which represents an updated version of the first example UI display screen 30 of FIG. 2A after user selection of the overflow control 44 of the breadcrumb bar 40.

User selection of the overflow control 44, triggers display of an associated drop-down list, also called drop-down menu 84. The drop-down menu lists various breadcrumbs 86. The various breadcrumbs 86 are called intervening breadcrumbs, as they indicate navigation locations or instances of navigation history information pertaining to navigation locations visited between visits to the home location corresponding to the root breadcrumb 42 and the Project Athena location corresponding to the Project Athena breadcrumb 46.

The breadcrumbs 86 represent specific types of breadcrumbs called breadcrumb items herein. For the purposes of the present discussion, a breadcrumb item may be any representation of a breadcrumb that is not immediately displayed in a breadcrumb bar, but is otherwise accessible via or displayed in a drop-down menu, list, hover layer, and so on, which may be included in a breadcrumb bar.

The breadcrumbs 86 of the drop-down menu are organized according to order of visit of navigation locations, i.e., UI display screens (also called pages herein), associated with each of the breadcrumbs 86. Hence, the breadcrumbs 86 are hierarchically arranged in accordance with associated page visit order.

Note however, that depending upon the needs of a given implementation, the listed breadcrumbs 86 of the drop-down menu 84 are not necessarily organized in order of age, i.e., visit order of the associated pages. For example, the listed breadcrumbs 86 may be organized in accordance with a hierarchical structure of an underlying file system or UI framework structure. However, in practice, visit order of pages will often coincide with hierarchical structures of a file system, database, or other structures of other content browsed via underlying UI software, such that page visit order will be similar to hierarchal order of the underlying document structure.

Nevertheless, in certain implementations, breadcrumbs 86 displayed in the drop-down menu 84 may include breadcrumbs that have not been visited by a user, but occur in an underlying structure (e.g., file system structure) between pages indicated by the home breadcrumb 42 and the overflow control 44.

Furthermore, in certain implementations, breadcrumbs of the drop-down menu 84 may be expandable, enabling access to sub-folders associated with the listed breadcrumbs 86, as discussed more fully below. In such cases, drop-down menu flyouts, hover layers, and/or other mechanisms may be employed to display breadcrumbs corresponding subfolders of other intervening folders.

Hence, the drop-down menu 84 lists intervening, historical, and/or hierarchal breadcrumbs arranged in accordance with user navigation history (e.g., page access order) and/or underlying software structures used to organize content and/or functionality accessible via the breadcrumbs 86.

Furthermore, the drop-down list 82 may be detachable and draggable (i.e., moveable) and may include menu item flyouts, e.g., for viewing breadcrumb settings, properties of associated content, and so on. In addition, in certain implementations, the drop-down menu may be displayed in a separate page, as opposed to a hover layer or menu overlaid on the UI display screen 82.

The breadcrumb bar 40 may be adaptive to display properties, such as screen resolution and size, and the number of navigation locations visited by a user and to be displayed in the breadcrumb bar 40. For example, certain large displays may enable display of more than the three breadcrumbs 42, 46, 48, before intervening breadcrumbs are collapsed into the overflow control 44. Similarly, certain small and/or low resolution displays may trigger display of fewer than the three breadcrumbs 42, 46, 48 and may further trigger abbreviations (e.g., truncations) of names of the breadcrumbs 42, 46, 48, as discussed more fully below, e.g., with reference to FIG. 4A. Alternatively, or in addition, the breadcrumb bar 40 may be made scrollable 40.

Similarly, the drop-down menu 84 may be made scrollable when large numbers of breadcrumbs are to be displayed in the drop-down menu 84. Alternatively, or in addition, groups of breadcrumbs in the drop-down menu 84 may be collapsed into sub-overflow controls positioned in the drop-down menu 84 to hold intervening breadcrumbs positioned between earlier and later breadcrumbs. Where the meaning of the terms "earlier" and "later" may refer to hierarchical position order in a historically arranged hierarchy and/or a structurally arranged hierarchy.

Those skilled in the art with access to the present teachings may readily implement the breadcrumb bar 40 and drop-down menu 84, e.g., as a feature of a browser or other software, without undue experimentation.

Hence, breadcrumbs of a, breadcrumbs of a breadcrumb trail may be condensed or collapsed, e.g., into a drop-down menu, such as the drop-down menu 84, when a breadcrumb trail would otherwise be too large to display, e.g., in a breadcrumb bar 40.

In summary, FIG. 2B shows a UI display screen 82, including the drop-down menu 84, which is generated when breadcrumb button 44 is selected. In FIG. 2B, the breadcrumb drop-down menu 84 (also called window 84) includes the names of four folders, which correspond to the names of the breadcrumbs 86. The indicated names and associated breadcrumbs 86 are between the current folder and the root folder. These are generically named "Folder 1," "Folder 1.1," "Folder 1.1.1," and "Folder 1.1.1.1". In other embodiments, the actual folder names would be used such as the current folder name "Apps Integration." These folders are listed in order of closest to the root folder to farthest removed from the root folder, so that, for example, Folder 1 is the intervening folder closest to the root directory/folder; Folder 1.1 is the second closest folder from the root folder; Folder 1.1.1 is the third closest folder from the root folder; and Folder 1.1.1.1 is closest to the current folder (which would normally be named "Apps Integration"—matching the name of the associated breadcrumb 48).

As set forth above, another embodiment can use, in a breadcrumb list, only folders that the user has actually visited. These folders that have actually been visited can be listed in the order visited. Or they can be listed in an order depending on their level in a directory hierarchy, such as closest to the root directory first, or last, or in another arrangement, as desired.

FIGS. 3A-3H illustrate an example of progressive building of buttons in a navigation bar in response to a user navigating folders.

FIG. 3A illustrates a third example UI display screen 90 adapted for use with a mobile computing device, such as a smartphone. The third example UI display screen 90 shows a root folder 98 and associated content 102-104 in advance of user software navigation. The example content includes a first subfolder 102 of the root folder 98 and an example file 104.

The third example UI display screen 90 includes a header section 92 and a content section 94. The header section 92 indicates the name of the current folder (i.e., "All Files") 98 and includes additional example UI controls 100, such as a search control and an add files or folders control.

In the present example embodiment, a user selects the first folder 102 (named Benson Test Folder), thereby triggering display of a breadcrumb bar and indications of content included in the first subfolder 102, as discussed more fully below with reference to FIG. 3B.

In summary, the UI display screen 90 lacks a breadcrumb bar. This starting folder, i.e., initial navigation location represented by the content section 94 and named in the header section 98, can be set by default or by an action of the user or automatically by software (application, operating system, etc.). In FIG. 3A, the user may have arrived at the "All Files" folder by clicking an icon from a desktop, springboard, launching pad, icon page, etc.

FIG. 3B illustrates a forth example UI display screen 110, which represents an updated version of the third example UI display screen 90 of FIG. 3A after navigation to a first subfolder 102 (Benson Test Folder, shown in FIG. 3A) of the root folder 98 (All Files, shown in FIG. 3A), and illustrating addition of a breadcrumb bar 114.

The breadcrumb bar 114 includes a home button 122 and a subsequent first breadcrumb 124, which represents the previously visited UI display screen 90, i.e., the starting navigation location. The second breadcrumb 124 is a current location breadcrumb corresponding to, i.e., indicating, the selected first subfolder 102 of the UI display screen 90 of FIG. 3A.

The first breadcrumb 124 is called a child breadcrumb of the breadcrumb represented by the home button 122. Similarly, the home button 122 represents a parent breadcrumb of the first breadcrumb 124.

Content of the first folder 102 of FIG. 3A is represented in a content section 116 of the UI display screen 110 of FIG. 3B. The content includes an example folder (Benson Folder 1.1) 126 in an updated content section 116. Note that a header section 112, also called a header bar, represents an updated version of the header section 92 of FIG. 3A. The updated header section 112 has been updated with a header 118 indicating the name of the current navigation location, which corresponds to the name of the current location breadcrumb 124, and corresponds to the first subfolder 102 selected via the UI display screen 90 of FIG. 3A.

In the present example embodiment, a user selects the example folder 126 (Benson Folder 1.1), also called the second subfolder, which triggers navigation to a navigation location representing the example folder 126, as discussed more fully below with reference to FIG. 3C.

Figures 3C, 3D:
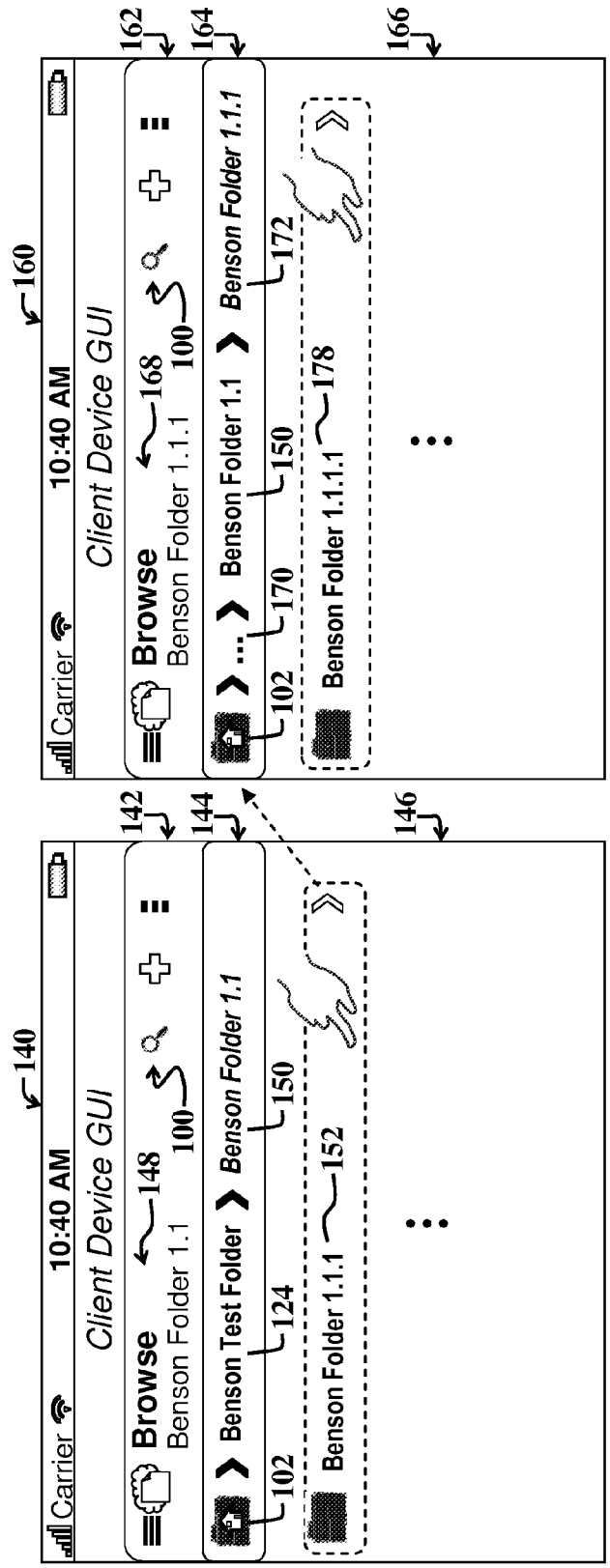
FIG. 3C illustrates a fifth example UI display screen, which represents an updated version of the fourth UI display screen of FIG. 3B after navigation to a second subfolder of the first subfolder, and illustrating addition of a second breadcrumb to the breadcrumb bar.
FIG. 3D illustrates a sixth example UI display screen, which represents an updated version of the fifth UI display screen of FIG. 3C after navigation to a third subfolder of the second subfolder, and illustrating addition of a third breadcrumb to the breadcrumb bar and a collapsing of the first breadcrumb into an overflow control.

In summary, FIG. 3C shows the UI display screen 160 appearing after user selection of the Benson Test Folder 102 of the UI display screen 90 of FIG. 3A. The navigation bar 114 has a single breadcrumb 124 in addition to the home button 122, positioned on the far left of the breadcrumb bar 114, also called the navigation bar. The home button 122 may be considered a type of breadcrumb, button, icon, tab, hyperlink or other control that designates home, root, or starting directory.

This button 122 represents the starting folder button and designates the user's home or starting directory. When clicked, the starting button 122 takes the user back to the "All Files" directory. The navigation bar also has the heading of the current directory "Benson Test Folder" to the right of the starting button. In other embodiments, this header 124 can include additional features or functionality, e.g., functions for facilitating rearranging items in a folder; displaying additional information about the current directory, and so on.

The breadcrumb bar 114 can be maintained if an application or other utility is using the space below the navigation bar. In this case, the buttons can return the user to the desired directory, and the current directory button 124 can function to bring up the folder browser with the current directory in view in place of the application or utility that was being used. Note that the header 118 may also act as a hyperlink or other UI control.

FIG. 3C illustrates a fifth example UI display screen 140, which represents an updated version of the fourth UI display screen 110 of FIG. 3B after navigation to the second subfolder 126 (Benson Folder 1.1, shown in FIG. 3B) of the first subfolder 102 (shown in FIG. 3A), and illustrating addition of a second breadcrumb 150 to an updated breadcrumb bar 144.

An updated header bar 142 shows a new header 148 naming the current navigation location indicated by a current location breadcrumb 150 (Benson Folder 1.1), i.e., the second breadcrumb 150. A third subfolder 152 in an updated content section 146 is shown included as a subfolder of the second subfolder 126 (shown in FIG. 3B) named in the updated header 148 and indicated by the current location breadcrumb 150.

In the present example embodiment, a user selects the third subfolder 152, which triggers navigation to a navigation location representing the third subfolder 152, as discussed more fully below with reference to FIG. 3D.

FIG. 3D illustrates a sixth example UI display screen 160, which represents an updated version of the fifth UI display screen 140 of FIG. 3C after navigation to the third subfolder 152 (Benson Folder 1.1.1, shown in FIG. 3C) of the second subfolder 124 (shown in FIG. 3B), and illustrating addition of a third breadcrumb 172 to an updated breadcrumb bar 164 and a collapsing of the first breadcrumb 124 (shown in FIG. 3C) into the overflow control 170.

An updated header bar 162 shows a new header 168 naming the current navigation location indicated by a current location breadcrumb 172 (Benson Folder 1.1.1), i.e., the third breadcrumb 172. A fourth subfolder 178 in an updated content section 166 is shown included as a subfolder of the third subfolder 152 (shown in FIG. 3C) named in the updated header 168 and indicated by the current location breadcrumb 172.

In the present example embodiment, a user selects the fourth subfolder 178, which triggers navigation to a navigation location representing the fourth subfolder 178, as discussed more fully below with reference to FIG. 3E.

FIG. 3E illustrates a seventh example UI display screen 180, which represents an updated version of the sixth UI display screen 160 of FIG. 3D after navigation to the fourth subfolder 178 (Benson Folder 1.1.1.1, shown in FIG. 3D) of the third subfolder 152 (shown in FIG. 3C), and illustrating addition of a fourth breadcrumb 190 to an updated breadcrumb bar 184 and a collapsing of the second breadcrumb 150 (shown in FIG. 3D) into the overflow control 170.

An updated header bar 182 shows a new header 188 naming the current navigation location indicated by a current location breadcrumb 190 (Benson Folder 1.1.1.1), i.e., the fourth breadcrumb 190. A fifth subfolder 192 in an updated content section 186 is shown included as a subfolder of the fourth subfolder 178 (shown in FIG. 3D) named in the updated header 188 and indicated by the current location breadcrumb 210.

In the present example embodiment, a user selects the fifth subfolder 192, which triggers navigation to a navigation location representing the fifth subfolder 192, as discussed more fully below with reference to FIG. 3F.

FIG. 3F illustrates an eighth example UI display screen 200, which represents an updated version of the seventh UI display screen 180 of FIG. 3E after navigation to a fifth subfolder 192 (Folder 123456789, shown in FIG. 3E) of the fourth subfolder 178 (shown in FIG. 3D), and illustrating addition of a fifth breadcrumb 210 to an updated breadcrumb bar 202 and a collapsing of the third breadcrumb 172 (shown in FIG. 3E) into the overflow control 170.

An updated header bar 202 shows a new header 208 naming the current navigation location indicated by a current location breadcrumb 210 (Folder 123456789), i.e., the fifth breadcrumb 210. A sixth subfolder 212 (Folder abcdefg) in an updated content section 206 is shown included as a subfolder of the fifth subfolder 192 (shown in FIG. 3D) named in the updated header 208 and indicated by the current location breadcrumb 210.

In the present example embodiment, a user selects the sixth subfolder 212, which triggers navigation to a navigation location representing the sixth subfolder 212, as discussed more fully below with reference to FIG. 3G.

FIG. 3G illustrates a ninth example UI display screen 220, which represents an updated version of the eighth UI display screen 200 of FIG. 3F after navigation to the sixth subfolder 212 (Folder abcdefg, shown in FIG. 3F) of the fifth subfolder 192 (shown in FIG. 3E), and illustrating addition of a sixth breadcrumb 230 to an updated breadcrumb bar 224 and a collapsing of the fourth breadcrumb 190 (shown in FIG. 3F) into the overflow control 170.

An updated header bar 222 shows a new header 228 naming the current navigation location indicated by a current location breadcrumb 230 (Folder abcdefg), i.e., the sixth breadcrumb 230. A seventh subfolder 232 (Folder hijklm) in an updated content section 226 is shown included as a subfolder of the sixth subfolder 212 (shown in FIG. 3F) named in the updated header 228 and indicated by the current location breadcrumb 230.

In the present example embodiment, a user selects the overflow control 170, triggering display of a drop-down men, as discussed more fully below with reference to FIG. 3H.

FIG. 3H illustrates a tenth example UI display screen 240, which represents an updated version of the ninth example UI display screen 220 of FIG. 3G after activation of the overflow control 170 to display a drop-down menu 252 with breadcrumb items 154 (also called breadcrumb menu items or list elements) therein.

The example drop-down menu 252 illustrates intervening breadcrumbs 254 between the home breadcrumb 102 and the parent location breadcrumb 230 (Folder 123456789) of the current location breadcrumb 250. In the present example embodiment, the breadcrumbs 254 are listed the order of visit of corresponding pages, i.e., UI display screens indicated by the names of the breadcrumbs 254.

The example drop-down menu 254 further includes an example close control 256 and a detach and drag control 258. The example detach and drag control 258 is adapted to facilitate detaching the drop-down menu 252 from the breadcrumb bar 224 and repositioning, resizing, and/or reshaping the drop-down menu 254, depending upon where and how it is dragged across the UI display screen 240.

Note that in certain implementations, repositioning of the drop-down menu 252 may automatically result in a second breadcrumb bar containing the breadcrumbs corresponding to the breadcrumb menu items 254 of the drop-down menu 252.

Hence, breadcrumbs of the breadcrumb bar 224 are added until a predetermined number of breadcrumbs (or a predetermined total length of breadcrumbs that would be positioned in the breadcrumb bar 224), i.e., until a predetermined number of navigation locations is visited, after which intervening breadcrumbs are collapsed into the overflow control 170 and made accessible via an associated drop-down menu 254.

In summary, FIG. 3H shows the results of the user selection or activation of the breadcrumb button, i.e., overflow control 170, from the display of FIG. 3G. In FIG. 3H, the breadcrumb list 254 of folders intervening between the starting folder (associated with the home breadcrumb button 102) and the parent folder (indicated by breadcrumb 230, labeled Folder 123456789) are shown. These folders can be selected by the user for fast return to or transition to the selected folder. If the breadcrumb display of the breadcrumb overflow menu 252 is limited in size, and more directory names are desired, scroll bars or other ways of displaying the folder names in the breadcrumb list 252 can be employed.

Figures 4A, 4B:
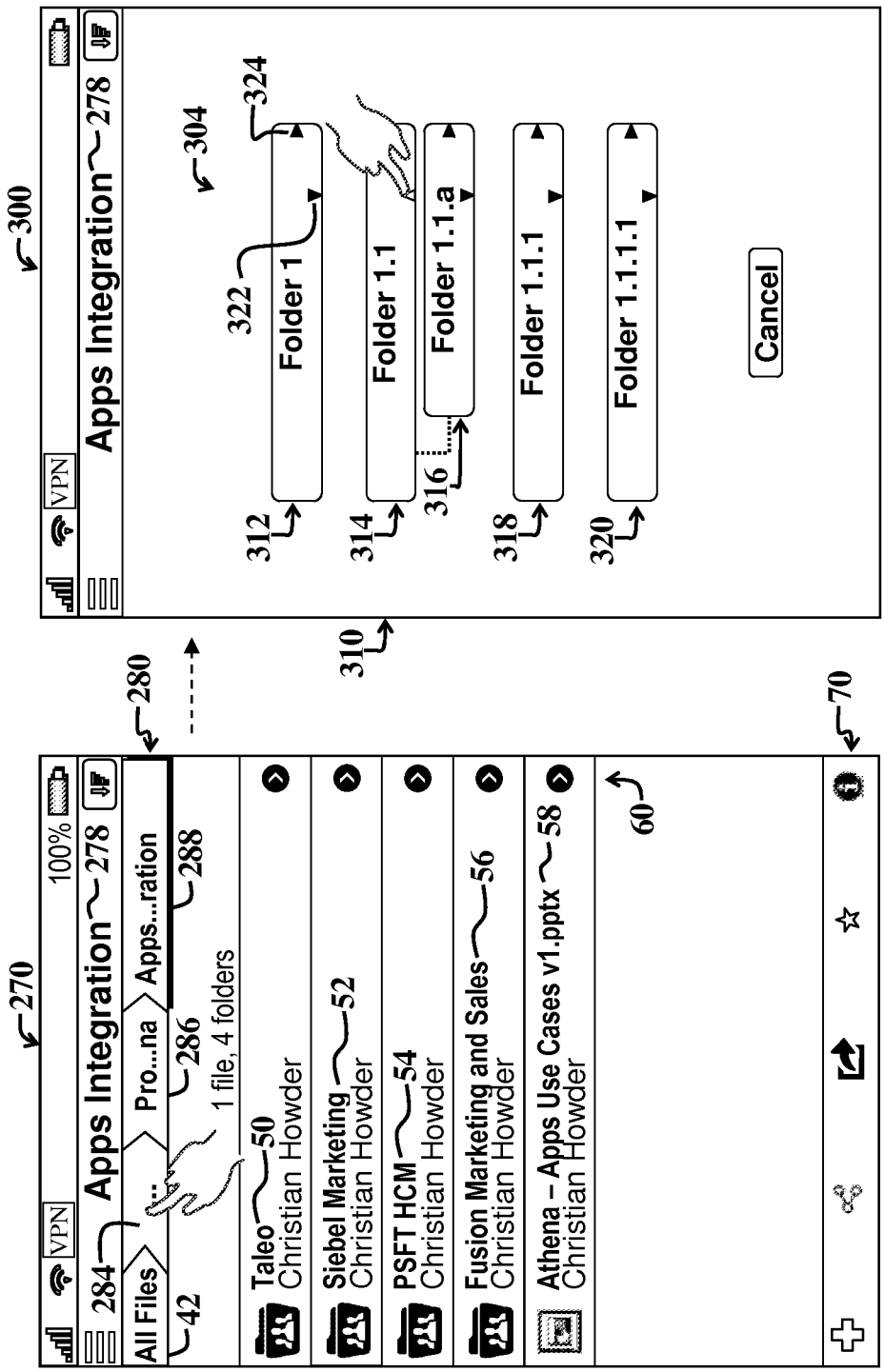
FIG. 4A illustrates an eleventh example UI display screen, which represents a version of the first example UI display screen of FIG. 2A, which has been adjusted for a small smartphone or mobile device display.
FIG. 4B illustrates a twelfth example UI display screen, which represents a version of the eleventh example UI display screen of FIG. 4A after user selection of an overflow button, showing an approximately full-screen overflow menu listing breadcrumbs accessible via the overflow button.

FIG. 4A illustrates an eleventh example UI display screen 270, which represents a version of the first example UI display screen 30 of FIG. 2A, which has been adjusted for a small mobile device display, such as a smartphone touch display.

The UI display screen 270 is similar to the UI display screen 30 of FIG. 2A with the exception that the left panel 34 of FIG. 2A is removed from the UI display screen 270, and names of updated breadcrumbs 286, 288 have been abbreviated. For example the name of the current location breadcrumb 40 of FIG. 2A has been changed from "Apps Integration" in FIG. 2A to "Apps . . . ration" in FIG. 4A.

Note that exact details of abbreviation methods and associated rules are implementation specific and may vary, without departing from the scope of the present teachings.

FIG. 4B illustrates a twelfth example UI display screen 300, which represents a version of the eleventh example UI display screen 270 of FIG. 4A after user selection of an overflow control 284 of FIG. 4A. The resulting displayed menu 304 is an approximately full-screen overflow menu listing breadcrumbs 312-320 (which may be called breadcrumb menu items or list items when presented in a menu or list) accessible via the overflow button 284 of FIG. 4A.

The example listed breadcrumbs 312 include UI controls 322, 324, which are adapted to enable viewing of sub-breadcrumbs (e.g., a sub-breadcrumb 316 of the breadcrumb 314) and selecting breadcrumbs for transitioning navigation location to the UI display screen indicated by the selected breadcrumb, respectively.

In the present example embodiment, a user has selected an expand UI control 322 of a second folder 314, resulting in display of a sub-breadcrumb 316 (corresponding to or linked to the indicated Folder 1.1.a) of the associated breadcrumb 314.

Note that a user may not necessarily previously navigated to the folder associated with the sub-breadcrumb 316. Accordingly, the display of and order of breadcrumbs listed in a drop-down menu or other breadcrumb menu are not required to all represent previously navigated items and may not necessarily be sorted strictly in navigation history order. Instead, and/or in addition, breadcrumb listings may be organized in accordance with underlying hierarchical structures used to organize underlying content.

FIG. 5A illustrates a thirteenth example UI display screen 330 showing a modified version of the breadcrumb bar 334 and header bar 332 of the eleventh example UI display screen 270 of FIG. 4B. Various breadcrumb buttons 42, 286, 288 shown in FIG. 4A are replaced with tabs 342, 346, 348, respectively, in FIG. 5A.

The header bar 332 includes additional UI navigation controls 340 adjacent to the header 338. In addition, the displayed name of the start breadcrumb 42 of FIG. 4A is replaced with a start icon 342 in FIG. 330 in the altered breadcrumb bar 334. An example folder 350 is shown in a content section 336.

In the present example embodiment, a user selects the overflow control 334, which triggers display of an alternative drop-down menu, as discussed more fully below with reference to FIG. 5B.

FIG. 5B illustrates a fourteenth example UI display screen 360, which represents an updated version of the thirteenth example UI display screen 330 of FIG. 5A after user selection of the breadcrumb button 344 and subsequent display of a drop-down menu 370 and associated breadcrumbs 374.

The example drop-down menu 370 includes an additional scrolling control 376, which may facilitate exposing additional breadcrumbs that may be included in the drop-down menu 370 but not currently shown. Note that vertical or horizontal scroll bars or other scrolling UI controls may be automatically included in the drop-down menu 370 to meet the needs of a given implementation. For example, a drop-down menu that would include several items due to extensive software navigation activities may automatically adjust as needed to include scrolling features.

In summary, in FIG. 5B, the drop-down menu 370 is shown taking up a relatively small portion of the UI display screen 360. In general the size, shape, color, graphic and other attributes of the buttons and breadcrumbs 374 in the drop-down menu 370, may vary according to design choice. Different controls may be included on the buttons or lists. For example, FIG. 4B shows a "Cancel" button on the breadcrumb list 304.

Many variations are possible. In some embodiments there is a limit placed on the number of locations that can be shown in the locations list, i.e., a list of breadcrumbs identifying navigation locations, e.g., folders, and providing functionality for facilitating access thereto. After this number is exceeded, which may correspond to a number of generated breadcrumbs (not all of which need be directly displayed in a breadcrumb bar, but may be indirectly displayed in the breadcrumb bar via an overflow control that provides user access to a drop-down menu containing the indirectly displayed breadcrumbs).

A scroll bar or other scrolling mechanism 376 enables scrolling to view any portions of the breadcrumb list 374 that are not otherwise immediately viewable. Alternatively, the drop-down menu 370 may be adjusted to only list a certain number of breadcrumbs, e.g., five breadcrumbs, which corresponding to navigation locations, which correspond to previously visited folders, which correspond to instances of navigation history information.

Figure 6:
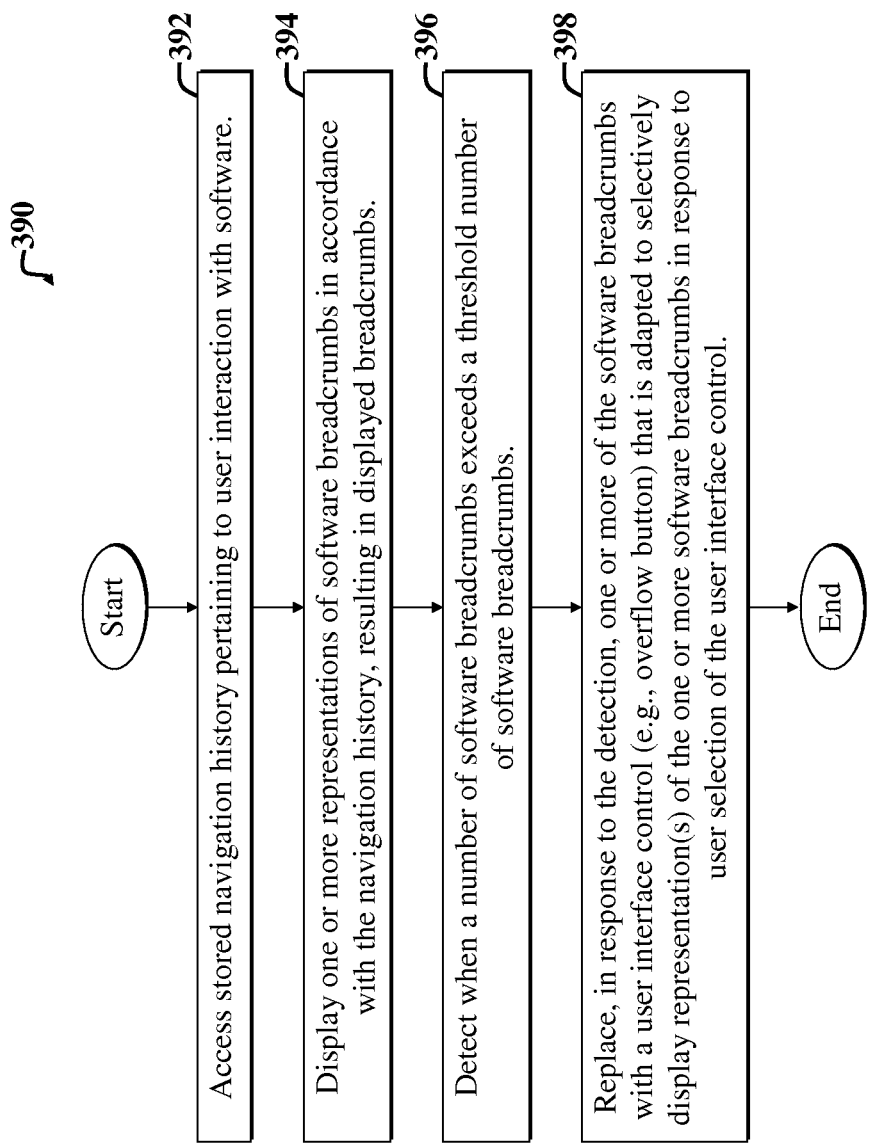
FIG. 6 illustrates a flow diagram of an example method adapted for use with the embodiments of FIGS. 1-5B.

FIG. 6 illustrates a flow diagram of an example method 390 adapted for use with the embodiments of FIGS. 1-5B. The example method 390 is adapted to facilitate software navigation and includes a first step 392, which involve accessing stored navigation history information pertaining to user interaction with software.

A second step 394 includes displaying one or more representations of software breadcrumbs in accordance with the navigation history, resulting in displayed breadcrumbs.

A third step 396 includes detecting when a number of software breadcrumbs (i.e., visited navigation locations) exceeds a threshold number of software breadcrumbs, such as two, and then issuing a detection signal in response thereto.

A fourth step 398 includes replacing, in response to the detection signal, one or more of the software breadcrumbs with a UI control (e.g., overflow control) that is adapted to selectively display representations of the one or more software breadcrumbs (e.g., via a drop-down menu) in response to user selection of the UI control. Hence, the fourth step 398 may include employing, in response to the detection signal, a UI control to represent plural software breadcrumbs.

For the purposes of the present discussion, a breadcrumb is said to be replaced by a UI control if the breadcrumb is collapsed into or otherwise included in or accessible via the UI control, such as a drop-down menu that may be activated in response to user selection of the UI control.

Hence, various embodiments herein may provide efficient mechanisms for condensing or collapsing breadcrumbs of a breadcrumb trail into a drop-down menu control when a breadcrumb trail would otherwise be too large to display.

Note that various steps 392-398 of the method may be altered, replaced, augmented, and/or interchanged with other steps, without departing from the scope of the present teachings. For example, an alternative method may include displaying multiple navigation buttons, i.e., breadcrumbs, on a display screen; determining that a navigation criterion (e.g., a threshold number of navigation locations has been visited) has been met; and displaying a breadcrumb button (e.g., overflow control) on a navigation bar in response to the criterion that was met.

Examples of additional steps that may augment the method 390 include detecting display size and resolution; adjusting properties of the breadcrumb bar in response thereto. The properties may include a given number of files or folders to indicate (e.g., via breadcrumbs) adjacent to an overflow breadcrumb button.

The example method 390 may further include displaying an overflow breadcrumb drop-down menu (i.e., breadcrumb button) between a home button and a current location breadcrumb; abbreviating breadcrumb labels; and so on.

Although the description has been described with respect to particular embodiments thereof, these particular embodiments are merely illustrative, and not restrictive. For example, while the present application is discussed with respect to navigation of file folders, and documents, such as webpages, embodiments are not limited thereto.

For example, methods discussed herein for selectively collapsing displayed representations of data, such as software navigation history indicated via breadcrumbs, may be employed to adjust software menus, not just navigation bars. For example, software menu structures (not just breadcrumbs) may be automatically updated to reflect changes based on user navigation history, and these menus may include updated menu items that effectively act as overflow controls, without departing from the scope of the present teachings.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A method for facilitating software navigation, the method comprising:
   accessing navigation history information pertaining to user interaction with software;
   accessing device screen properties for a mobile device display;
   displaying, via the mobile device display, one or more representations of breadcrumbs in accordance with the navigation history information and the device screen properties, resulting in displayed breadcrumbs;
   detecting when a number of breadcrumbs exceeds a threshold number of breadcrumbs;
   in response to the detection of the number of breadcrumbs exceeding the threshold number of breadcrumbs, changing at least some of the breadcrumbs to an active breadcrumb object configured as a user interface control to represent plural breadcrumbs; and
   in response to selection of the active breadcrumb object, presenting a user interface overflow control, wherein the user interface overflow control includes a plurality of intervening breadcrumbs representing one or more previously displayed user interface display screens, wherein at least one of the plurality of intervening breadcrumbs is configured as an intervening breadcrumb object configured with a plurality of sides, wherein the intervening breadcrumb object includes at least a first expand control positioned within and adjacent to a first side of the intervening breadcrumb object for navigating to a sub-breadcrumb, and a second expand control positioned within and adjacent to a second side of the intervening breadcrumb object for navigating to the sub-breadcrumb, wherein the first expand control is configured with a shape indicating a first breadcrumb expand and collapse direction, and when activated to expand the sub-breadcrumb, displays the sub-breadcrumb in a first position relative to the intervening breadcrumb object adjacent to the first side corresponding to the first breadcrumb expand and collapse direction, wherein the second expand control is configured with a shape to indicate a second breadcrumb expand and collapse direction.

2. The method of claim 1, wherein the user interface control includes a drop-down menu activated in response to activation of the user interface control, wherein the drop-down menu includes the plurality of intervening breadcrumbs.

3. The method of claim 2, wherein the one or more previously displayed user interface display screens represents one or more webpages of one or more websites.

4. The method of claim 2, wherein the one or more previously visited user interface display screens represents one or more file system folders.

5. The method of claim 4, wherein the one or more previously visited user interface display screens includes one or more representations of one or more files of the one or more file system folders.

6. The method of claim 1, wherein displaying further includes positioning one or more of the displayed breadcrumbs in a breadcrumb bar.

7. The method of claim 6, wherein the user interface control includes a drop-down menu indicating one or more intervening user interface display screens between a first displayed breadcrumb and a second displayed breadcrumb, wherein the first displayed breadcrumb and the second displayed breadcrumb are positioned approximately adjacent to opposing sides of the user interface control.

8. The method of claim 7, wherein the one or more intervening user interface display screens includes one or more user selectable representations of one or more folders between the first displayed breadcrumb and the second displayed breadcrumb in accordance with a folder hierarchy.

9. The method of claim 8, wherein the one or more user selectable representations of the one or more folders includes a representation of a folder that was not previously visited in a navigation session for which the navigation history information is maintained.

10. The method of claim 7, wherein the one or more intervening user interface display screens includes a display of one or more folders between folders representing the first displayed breadcrumb and the second displayed breadcrumb in accordance with the navigation history information.

11. The method of claim 7, wherein the drop-down menu includes hierarchically arranged breadcrumb items.

12. The method of claim 11, further including arranging the hierarchically arranged breadcrumb items in accordance with the navigation history information.

13. The method of claim 11, further including arranging the hierarchically arranged breadcrumb items in accordance with a document structure characterizing one or more documents between a first breadcrumb and a second breadcrumb, represented by the first displayed breadcrumb and the second displayed breadcrumb, respectively.

14. The method of claim 6, further including providing a user option to reposition the breadcrumb bar.

15. The method of claim 7, further including displaying a leftmost breadcrumb displayed in the breadcrumb bar as a navigation starting position.

16. The method of claim 6, further including positioning the breadcrumb bar adjacent to a toolbar, and indicating, via a title of the toolbar, a current navigated location in the software corresponding to a currently displayed user interface display screen.

17. The method of claim 1, further including detecting when one or more names of one or more breadcrumbs will not fit within a displayed breadcrumb bar and selectively abbreviating the one or more names in response to the detection.

18. The method of claim 1, wherein at least one of the plurality of intervening breadcrumbs includes at least one other expand user interface control positioned therein to expand and collapse viewing of a sub-breadcrumb representing a displayed user interface screen independent of the navigation history information.

19. An apparatus comprising:
   a digital processor coupled to a display and to a processor-readable storage device, wherein the processor-readable storage device includes one or more instructions executable by the digital processor to perform the following acts:
   accessing navigation history information pertaining to user interaction with software; accessing device screen properties for a mobile device display;
   displaying via the mobile device display, one or more representations of breadcrumbs in accordance with the navigation history information and the device screen properties, resulting in displayed breadcrumbs;
   detecting when a number of breadcrumbs exceeds a threshold number of breadcrumbs;
   in response to the detection of the number of breadcrumbs exceeding the threshold number of breadcrumbs, changing at least some of the breadcrumbs to an active breadcrumb object configured as a user interface control to represent plural breadcrumbs; and in response to selection of the active breadcrumb object, presenting a user interface overflow control, wherein the user interface overflow control includes a plurality of intervening breadcrumbs representing one or more previously displayed user interface display screens, wherein at least one of the plurality of intervening breadcrumbs is configured as an intervening breadcrumb object configured with a plurality of sides, wherein the intervening breadcrumb object includes at least a first expand control positioned within and adjacent to a first side of the intervening breadcrumb object for navigating to a sub-breadcrumb, and a second expand control positioned within and adjacent to a second side of the intervening breadcrumb object for navigating to the sub-breadcrumb, wherein the first expand control is configured with a shape indicating a first breadcrumb expand and collapse direction, and when activated to expand the sub-breadcrumb, displays the sub-breadcrumb in a first position relative to the intervening breadcrumb object adjacent to the first side corresponding to the first breadcrumb expand and collapse direction, wherein the second expand control is configured with a shape to indicate a second breadcrumb expand and collapse direction.

20. A non-transitory processor-readable storage device including instructions executable by a digital processor, the processor-readable storage device including one or more instructions for:
accessing navigation history information pertaining to user interaction with software;
accessing device screen properties for a mobile device display;
displaying via the mobile device display, one or more representations of breadcrumbs in accordance with the navigation history information and the device screen properties, resulting in displayed breadcrumbs;
detecting when a number of breadcrumbs exceeds a threshold number of breadcrumbs; and
in response to the detection of the number of breadcrumbs exceeding the threshold number of breadcrumbs, changing at least some of the breadcrumbs to an active breadcrumb object configured as a user interface control to represent plural breadcrumbs; and
in response to selection of the active breadcrumb object, presenting a user interface overflow control, wherein the user interface overflow control includes a plurality of intervening breadcrumbs representing one or more previously displayed user interface display screens, wherein at least one of the plurality of intervening breadcrumbs is configured as an intervening breadcrumb object configured with a plurality of sides, wherein the intervening breadcrumb object includes at least a first expand control positioned within and adjacent to a first side of the intervening breadcrumb object for navigating to a sub-breadcrumb, and a second expand control positioned within and adjacent to a second side of the intervening breadcrumb object for navigating to the sub-breadcrumb, wherein the first expand control is configured with a shape indicating a first breadcrumb expand and collapse direction, and when activated to expand the sub-breadcrumb, displays the sub-breadcrumb in a first position relative to the intervening breadcrumb object adjacent to the first side corresponding to the first breadcrumb expand and collapse direction, wherein the second expand control is configured with a shape to indicate a second breadcrumb expand and collapse direction.

* * * * *

UNITED STATES PATENT AND TRADEMARK OFFICE
CERTIFICATE OF CORRECTION

Page 1 of 1

PATENT NO. : 9,959,358 B2
APPLICATION NO. : 14/457878
DATED : May 1, 2018
INVENTOR(S) : Lam

It is certified that error appears in the above-identified patent and that said Letters Patent is hereby corrected as shown below:

In the Specification

In Column 7, Lines 12-13, delete "a the" and insert -- the --, therefor.

In the Claims

In Column 22, Line 4, in Claim 20, after "breadcrumbs;" delete "and".

Signed and Sealed this
Second Day of March, 2021

Drew Hirshfeld
*Performing the Functions and Duties of the
Under Secretary of Commerce for Intellectual Property and
Director of the United States Patent and Trademark Office*